United States Patent [19]
Mittelmann

[11] Patent Number: 4,497,525
[45] Date of Patent: * Feb. 5, 1985

[54] CONTAINER, IN PARTICULAR FOR TRANSPORTING FREIGHT BY AIR

[75] Inventor: Gerhard Mittelmann, Oehningen, Fed. Rep. of Germany

[73] Assignee: Swiss Aluminium Ltd., Chippis, Switzerland

[*] Notice: The portion of the term of this patent subsequent to Nov. 2, 1999 has been disclaimed.

[21] Appl. No.: 390,052

[22] Filed: Jun. 18, 1982

Related U.S. Application Data

[63] Continuation of Ser. No. 40,465, May 18, 1979.

[30] Foreign Application Priority Data

Jun. 3, 1978 [DE] Fed. Rep. of Germany ....... 2824434

[51] Int. Cl.³ .................. B65D 88/00; A47F 5/10
[52] U.S. Cl. .................. 312/321; 312/258; 220/1.5; 211/113
[58] Field of Search .......... 312/321, 258, 351, 352, 312/300; 410/143; 211/113, 123, 124, 162; 220/1.5; 206/284, 289, 291; 52/7; 135/109, 112, 113

[56] References Cited

U.S. PATENT DOCUMENTS

| | | | |
|---|---|---|---|
| 840,140 | 1/1907 | Neer | 312/321 |
| 1,170,188 | 2/1916 | Rasmussen et al. | 135/113 |
| 1,219,736 | 3/1917 | Hawley | 312/321 |
| 1,332,286 | 3/1920 | Brasch | 312/321 |
| 1,969,260 | 8/1934 | Dixon et al. | 135/112 |
| 3,021,958 | 2/1962 | Winkler | 211/124 |
| 3,133,549 | 5/1964 | Severing | 135/109 |
| 3,183,855 | 5/1965 | Adler | 410/143 |
| 3,672,529 | 6/1972 | Feddersen et al. | 220/1.5 |
| 3,784,023 | 1/1974 | Varon et al. | 211/123 |
| 3,963,290 | 1/1976 | Rennemann | 312/321 |
| 4,236,854 | 12/1980 | Rogers | 410/143 |

*Primary Examiner*—Victor N. Sakran
*Attorney, Agent, or Firm*—Bachman and LaPointe

[57] ABSTRACT

A freight container is disclosed which can be used for transporting stackable items and hanging items. The container is particularly stable and features at least one section which contributes to the load-bearing frame, runs transversely and features an undercut groove in which sliding fixtures of flexible supports for hanging the hanging items can be inserted and, if desired, can be fixed at a predetermined spacing. A strut section with both ends attached to the base of the container and a vertical strut attached to the upper part of the frame or to a load-bearing section can be released from the frame at least at one end and secured to a profiled section in the upper part of the container.

4 Claims, 9 Drawing Figures

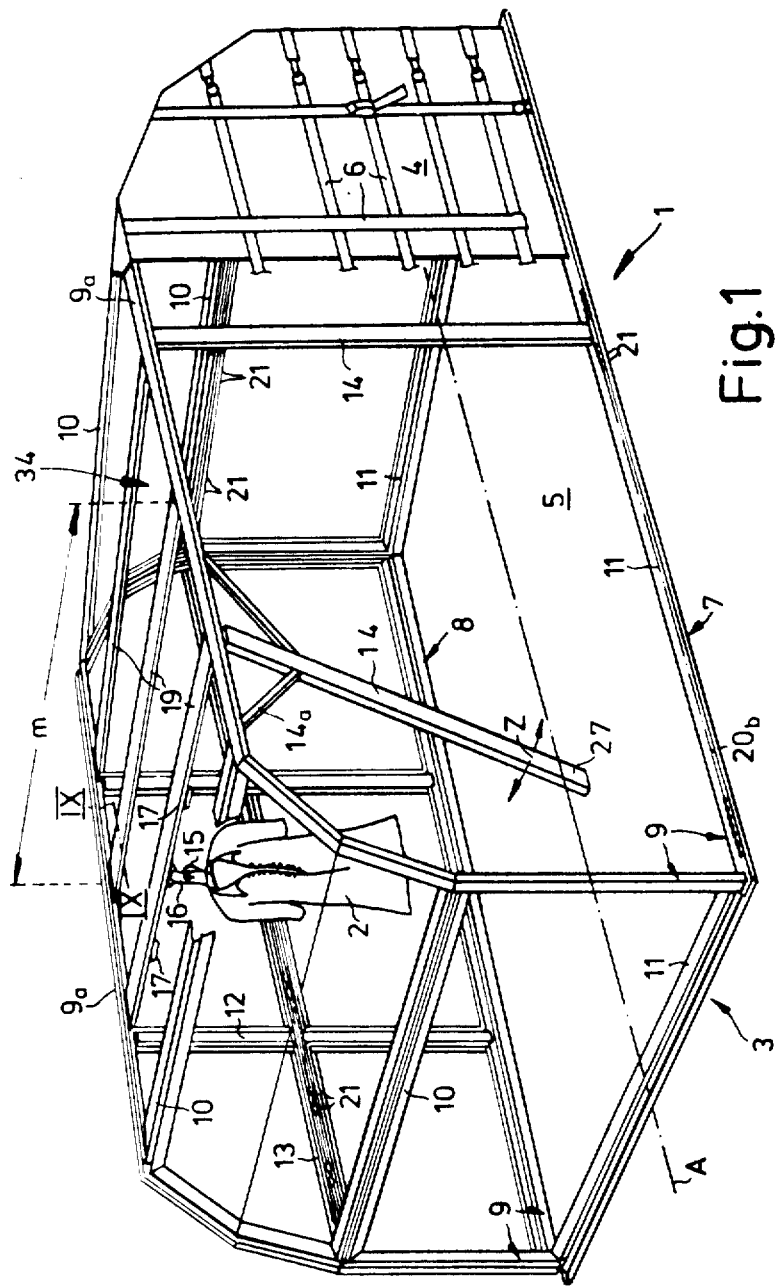

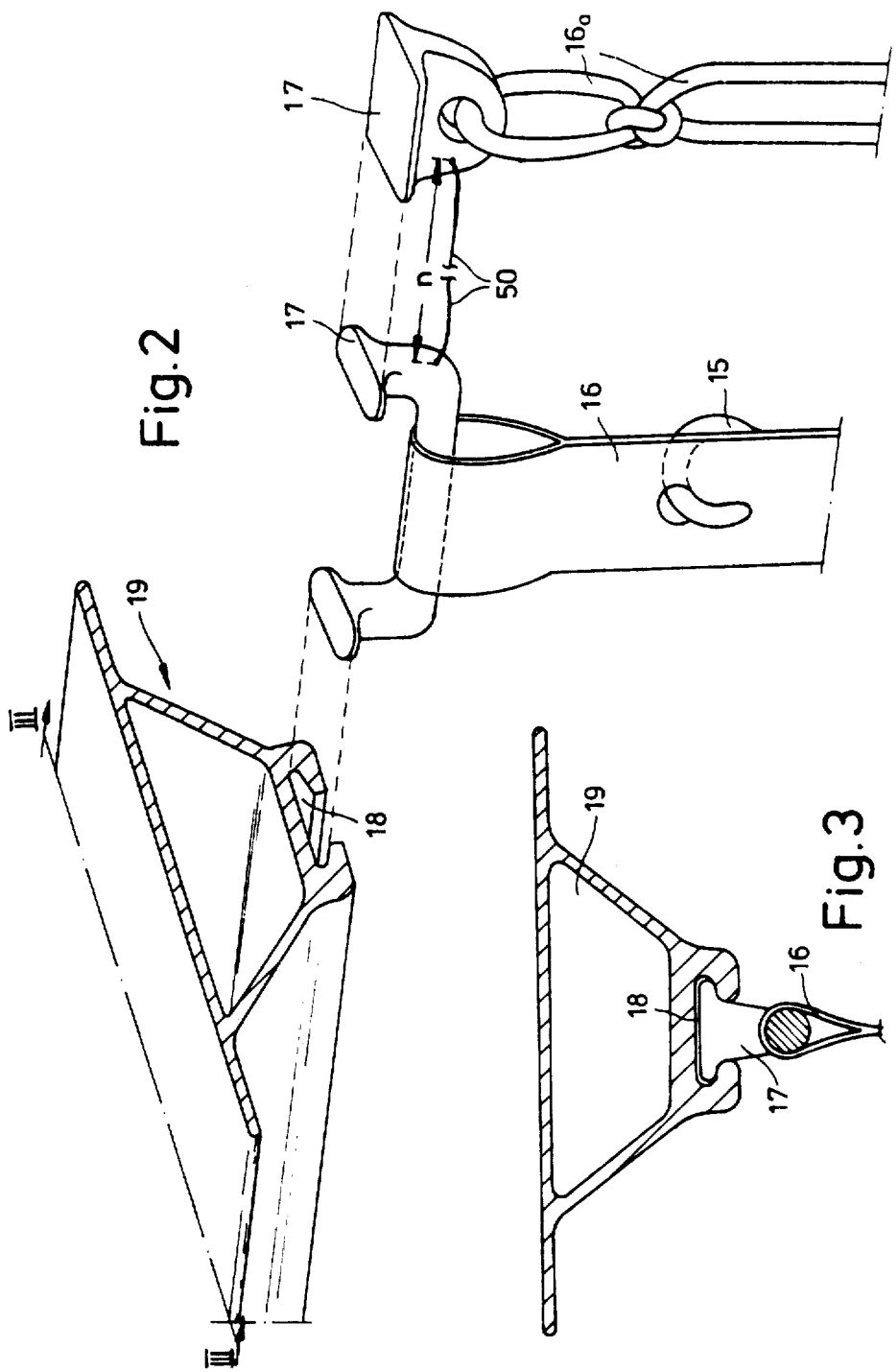

CONTAINER, IN PARTICULAR FOR TRANSPORTING FREIGHT BY AIR

This is a continuation of application Ser. No. 40,465, filed May 18, 1979.

BACKGROUND OF THE INVENTION

The present invention is drawn to a freight container, in particular a container for transporting freight by air, which comprises a structural frame of profiled rods or the like. The frame is covered at least in part with sheeting, fabric or the like. Freight containers are known which are used for the transportation of items which are stacked inside the container. Sometimes there is a need to transport items, such as clothing, in a hanging position inside the containers. In the containers available up to now, it has been possible to transport items in a hanging position only by placing special stands in the container and hanging the items on these. The stands have the disadvantage that they must be returned in the container with the result that the container can not be used on the return trip for the transportation of goods thus, they are returned almost empty. Collapsable stands have not proved to be of much value since the assembling and dismantling, and the special unpacking and re-packing is very inconvenient, and parts are often lost during transit.

SUMMARY OF THE INVENTION

In view of the foregoing, it is the principal object of the present invention to construct a freight container which can be used for transporting both stackable items and hanging items wherein the container does not require a great deal of alteration to adopt it for said items.

This object is achieved by way of the present invention wherein at least one structural profiled rod, which is part of the structural frame, runs transversely above the floor of the container and comprises at least one rail in which a plurality of flexible suspension facilities on sliding fixtures are fitted for the hanging items such as clothing or the like, and, if desired, can be fixed at predetermined distances from each other.

It is also within the scope of the present invention to design at least one of the support rods of the frame with one of its ends releasably fixed to the floor of the container and its other end attached to the roof of the container or to load-bearing rods, such that the support rod is releasable at least at one end from the frame and attachable to a profiled rod in the roof of the container.

In accordance with another feature of the present invention the supporting rod or section should be aligned with a load-bearing section and be able to be connected to it in such a way that the flexible supports, for example straps or cords, the sliding facilities can be stored away safely when not in use in the area of the roof of the container, i.e. away from the load bearing space inside the container.

A result of designing the container in this manner is that the supporting section and the load-bearing section, which is preferably in the region of the roof, form a closable magazine for the storage of the straps or cords hanging from the roof, the supporting section usefully being in the form of an open channel-shaped section with the open side facing into the interior of the container when not being used to form the said magazine.

As a result of this design, the hanging items can be hung up in a very simple manner inside the container. The roof section on which the hanging items are supported is securely held in place at both ends. The end of the roof section rests on a U-shaped supporting section. When goods which are normally stacked have to be transported, the supporting section, which is not necessary because of the low load on the roof, can be tilted out of the way when the loading side is opened, and held in place below the roof section where it envelops the straps keeping them out of the load-bearing space of the container.

Since the construction finds application mainly with containers having flexible coverings, it has been found useful to design the supporting rod such that its length can be altered in case the container has a hole which causes the covering to expand and contract. This change in length takes place preferably by means of a locking facility, which is provided in the axis of the supporting section or channel, connecting the supporting section to the base of the container when in its vertical load-bearing position, and can be moved by a preloaded facility. This locking facility can also be employed for securing the supporting section to the roof of the container, where it serves to retain the straps in a storage space formed with the help of that supporting section below the roof of the container.

The supporting section can, in accordance with another feature of the present invention, be swung up to a position below the roof section thereby making handling very simple. It is advantageous that this hinging action take place so that the supporting section, when in the vertical working position, acts as a prop between the roof and the floor of the container.

BRIEF DESCRIPTION OF THE DRAWING

Further advantages and features of the present invention will be explained hereinbelow and with the help of the drawings exemplifying the preferred embodiments wherein FIG. 1: Is a perspective view of a freight container with a structural frame having a covering, only part of which is shown.

FIG. 2: Is an enlarged exploded perspective view of the load bearing assembly illustrated in FIG. 1.

FIG. 3: Is a section taken along line III—III of FIG. 2 illustrating the load bearing section.

DETAILED DESCRIPTION

Figure 5:
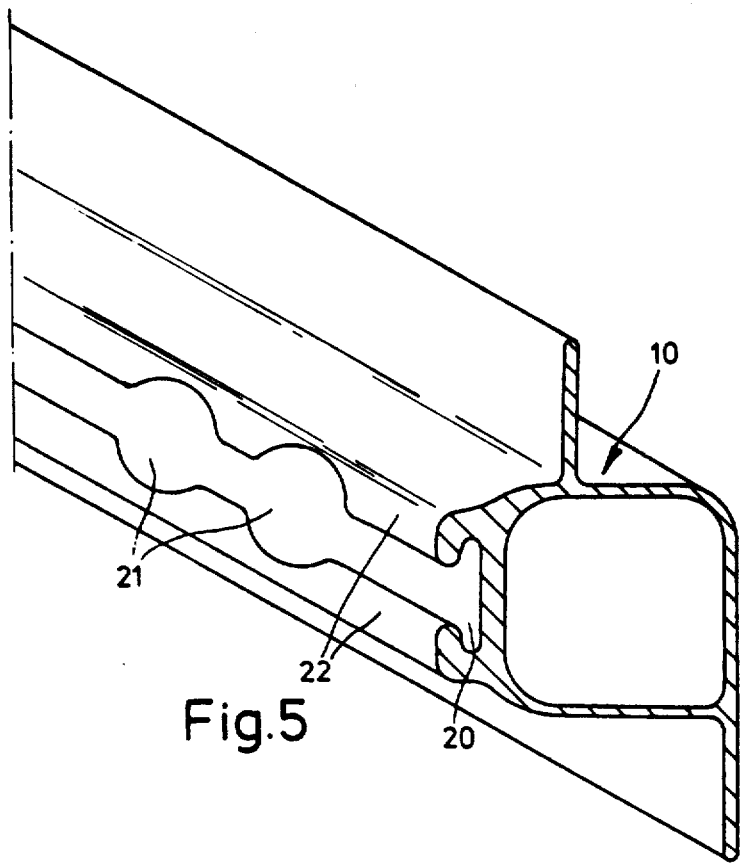
FIG. 5: Is a perspective view of an enlarged sectioned part of FIG. 1.
Figure 4:
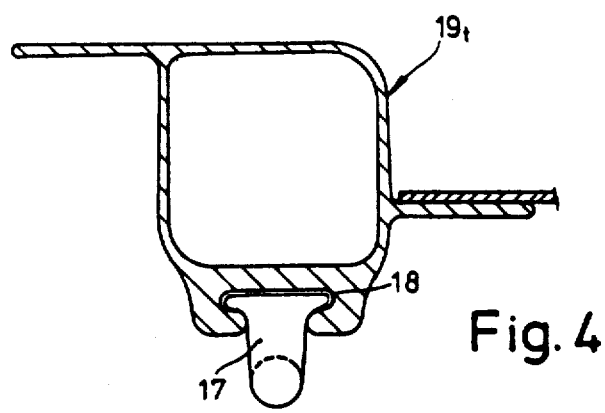
FIG. 4: Is a section through a second embodiment of a load bearing section.

A freight container 1 for storing articles of clothing 2 during transport by air comprises a flexible covering over a structural light metal frame and a network of straps 6 running parallel to the floor 5 and in the transverse direction.

The frame 3 comprises essentially two polygonal frames 9 which make up the longitudinal sides 7,8 of the container 1. The frames 9 are joined by sections 10 running transversely thereto. The polygonal frames 9 stand on a base frame 11. The long side 8 at the rear in FIG. 1 is reinforced by struts 12 and 13 running parallel and at right angles respectively to the floor. The other long side serves as the entry or loading side of the container and therefore is fitted with vertical supports 14 which can be tilted about the longitudinal axis A of the container 1 in the direction of the arrow z. The supports 14 are connected to the upper rod 9a of the polygonal frame 9 by inclined rods 14a.

As can best be seen in FIG. 2, a plurality of clothes hangers 15, each bearing an item of clothing, hang on straps 16 or cords 16a. The straps 16 or cords 16a in turn hang from sliding fixtures 17 which can slide in the undercut grooves 18 located in the load bearing sections 19. Both ends of load bearing section 19 rest and are secured to the upper rods 9a and run parallel to the transverse sections 10 of the frame 3.

With reference to FIGS. 1 and 5, the parts of the polygonal frame 9, the transverse sections 10 and the struts 12 in the long wall 8 also feature, at least in part, grooves 20 in which fixtures for clamping facilities can be introduced via openings 21 in the walls 22 forming the grooves, the said fixtures not being shown here simply to preserve clarity in the drawings.

Figure 6:
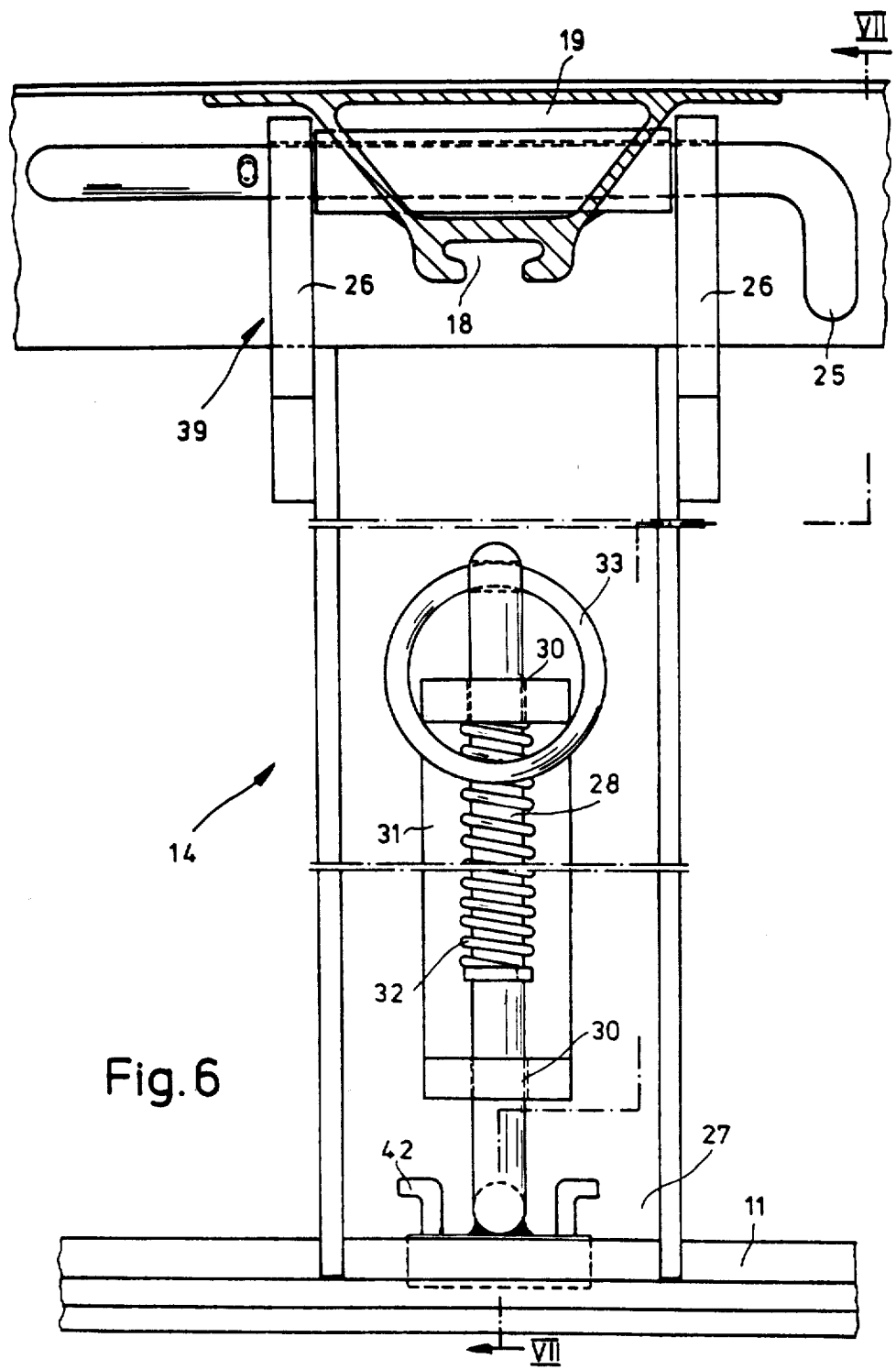
FIG. 6: Is a front view of an enlarged vertical strut of the structural frame.
Figure 7:
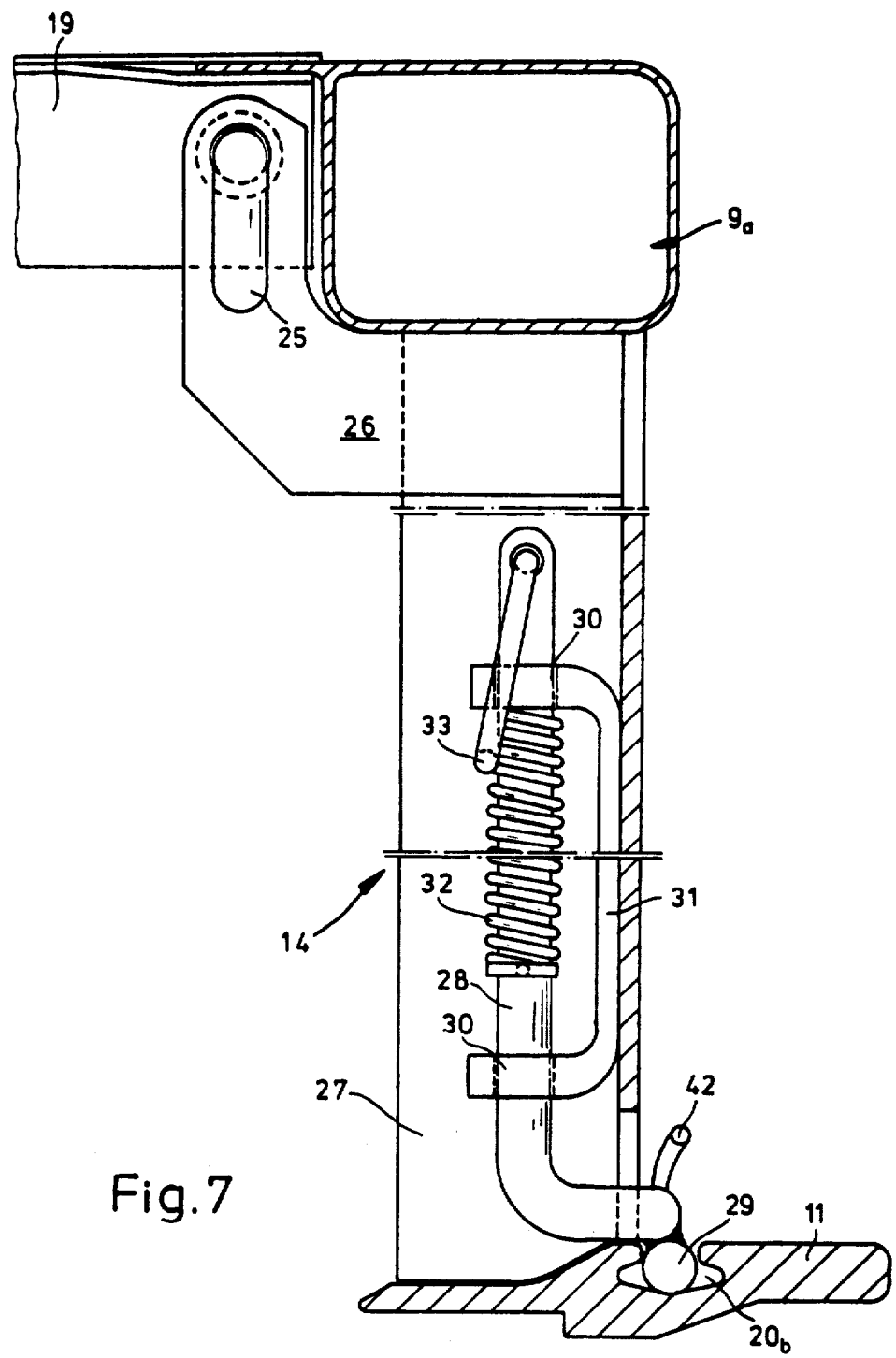
FIG. 7: Is an end view of the part shown in FIG. 6, sectioned along the line VII—VII.

Each of the vertical struts 14 is in the form of a U-shaped channel and is releasably fixed in the region of the polygonal frame 9, as can be seen in FIGS. 6 and 7, and hinged near the upper rod 9a on the load-bearing section 19 by a pin 25 which penetrates a hinge plate 26 on the section 14. These hinge plates 26 are, as shown in FIG. 7, made up from angle plate so that the section 14 hanging from it sits between the upper beam 9, which is in the form of a hollow section, and the base frame 11, and can then take on the role of supporting the load due to the clothing.

Figure 8:
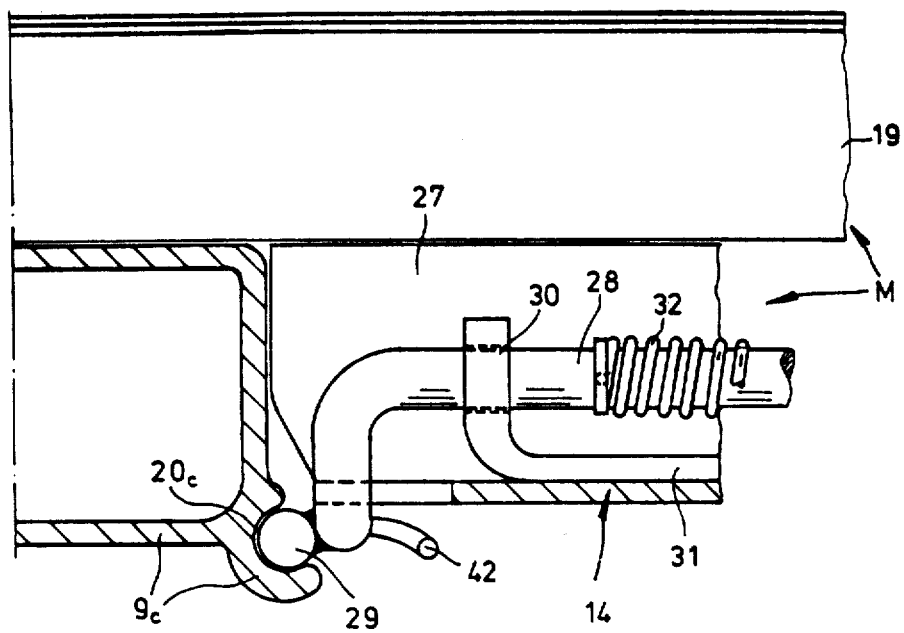
FIG. 8: Is an end view of a point of engagement for the vertical strut.

With reference to FIGS. 6 and 7 the lower end 27 of the supporting section 14 is secured to the base frame 11 by means of a locking fixture 28 comprising a pin 29 which engages on an undercut groove 20b in the base frame 11. The pin 29 passes through holes 30 in a U-shaped strut 31 and is held under in groove 20b force by a spiral spring 32. If one wishes to remove the pin 29 from the groove 20b, one pulls a ring 33 thus raising the locking facility 28 against the force of the spring 32. As can be seen in FIG. 8, the section 14 is tilted in the direction of the arrow z to the roof 34 of the container so that the straps 16 or the like hanging down are caught by the section 14 and held in the space 40. When the locking facility 28 engages in groove 20c in the upper rod 9c facing the hinge 39 the straps 16 are secured and prevented from sliding. The load-bearing sections 19 and struts 14 combine to form a compartment for these straps or the like facilities which are used for hanging up the items of clothing. At the same time, the struts 14 on the loading side 7 leave the opening free for loading the container.

Figure 9:
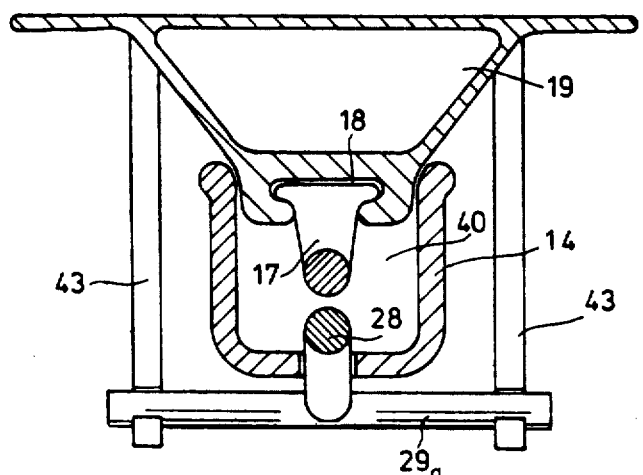
FIG. 9: Is another embodiment illustrating the point of engagement, shown herein in cross section as sectioned along the line IX—IX in FIG. 1.

In the embodiment shown in FIG. 9, the bolt 29a in the lock 28 is so long that it can be placed in hooks 43 on both sides of the section 10 and can be removed again. This version is particularly suitable for the case when the strut 14 is shorter than the section 19 and only partly forms the magazine M. Accordingly, hinge 39 can be situated as desired at any place on the section 19.

If the air freight container 1 is used for transporting articles of clothing 2, then the lock 28 is freed from groove 20c by means of horn-shaped levers 42, or as in FIG. 9 by means of the bolt 29a, and the strut 14 can then be brought back into its position as a support or for transporting goods. In this position the special design of the locking facility 28 also allows for a small extension of the strut 14 when the container 1 begins to "breathe" due to the movement of the container.

When the strut 14 is in the position for transporting suspended items e.g. clothing, the straps 16 hanging from the sliding fixtures 17 are distributed over the whole length m of sections 19. The distance between them is determined by cords or wires 50 the length of which can be altered. These cords 50 are not only for determining the distance n between the sliding fixtures 17, but also for introducing them into the groove 18.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A freight container for transporting hanging items and/or stackable items having a floor and a load supporting structural frame secured thereto, said frame including a plurality of load bearing rods running above said floor, the improvement comprising at least one support rod pivotably mounted on said frame and movable from a first load bearing position where said at least one support rod extends from said frame to said floor in a direction substantially perpendicular to said load bearing rods to a second non-load bearing position where said at least one support rod is substantially parallel to said load bearing rods wherein said at least one support rod is in said first position when transporting hanging items such that said at least one support rod aids in supporting said plurality of load bearing rods when said load bearing rods carry the hanging items.

2. A freight container according to claim 1 wherein said at least one support rod when in said second position abuts said at least on load bearing rod so as to form a storage compartment such that said at least one fixture and support means is stored in said storage compartment when not required.

3. A freight container according to claim 2 wherein said at least one support rod is in the form of a U-shaped channel having an opening facing the interior of said container which abuts with said at least one load bearing rod when said at least one support rod is in said second position.

4. A freight container according to claim 1 including a plurality of fixtures slidingly received in said at least one load bearing rod, said fixtures being connected to each other by means of flexible cords.

* * * * *